3,223,670
LATICES
Harry A. Cantor, Plainfield, William B. Horback, Irvington, Joseph A. Vona, Westfield, and Edward J. Kuczynski, Bayonne, N.J., assignors to Celanese Corporation of America, New York, N.Y., a corporation of Delaware
No Drawing. Filed May 24, 1962, Ser. No. 197,242
10 Claims. (Cl. 260—29.6)

The invention relates to improved synthetic latices.

Various synthetic latices based on polymerized unsaturated compounds have been prepared for use in coating compositions. While these latices have many advantages, they may not meet the desired level of effectiveness regarding one or more properties which minimizes their use in various applications. For example, when applied to fabrics to add body and weight, prevent ravelling, etc., the resulting coatings may not have the desired degree of such characteristics as wash fastness, drycleanability, good hand and resistance to discoloration. Moreover, the coating deposited may not have sufficient resistance to common dry cleaning solvents, e.g., perchloroethylene and Stoddard solvent.

It is an object of this invention to provide improved synthetic latices. It is a further object of the invention to provide synthetic latices capable of being used to produce coated fabrics having good wash fastness, drycleanability, and, resistance to discoloration and resistance to solvents such as perchloroethylene and Stoddard solvent. Other objects will be apparent from the following detailed description and claims.

In accordance with one aspect of the invention, a latex is prepared based on a copolymer of a monomeric mixture containing 15 to 60, preferably 20 to 60 parts by weight of vinyl acetate, 0.5 to 5.0, preferably 1 to 3 parts by weight of a mono-ethylenically unsaturated carboxylic acid, 35 to 85, preferably 40 to 80 parts by weight of an alkyl acrylate, and 1 to 15, preferably 2 to 5 parts by weight of a mono-ethylenically unsaturated compound containing an oxirane ring,

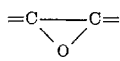

In addition to monomers from the above four classes which must be present, other comonomers may also be used, e.g., in an amount up to 10% based on the weight of monomeric mixture. Such comonomers are for example, acrylonitrile, methacrylonitrile, styrene, alpha-methyl styrene, alkylmethacrylates and alkyl maleates and fumarates, e.g., wherein the alkyl groups contain 1 to 18 carbon atoms and vinyl propionate.

The latices of this invention generally contain at least one surface-active agent which is preferably non-ionic. Some non-ionic surface active agents which may be used are condensation products of an alkyl phenol and ethylene oxide containing 8 to 9 carbon atoms in the alkyl group, and 20 to 100 oxyethylene groups, condensation products of a fatty alcohol and ethylene oxide having from 12 to 18 carbon atoms in the fatty alcohol chain and 20 to 100 oxyethylene groups, e.g., the condensation product of one mole of oleyl alcohol and about 20 moles of ethylene oxide and condensation products of polyethylene glycol and long chain fatty acids. Mixtures of surface-active agents may be used. The non-ionic surface active agent may be present for example, in the range of 0.5 to 10% preferably ½ to 8% by weight of the latex.

The latices of this invention are preferably prepared by polymerizing the monomers in the presence of the surface active agent which is present in the finished latex. The polymerization medium may also contain 0.05 to 0.5% by weight of an alkaline material, e.g., sodium acetate to control the pH during the polymerization.

The alkyl acrylate employed in the copolymer may be for example one in which the alkyl group contains up to 8 carbon atoms. Some alkyl acrylates which may be employed are ethyl acrylate, methyl acrylate, propyl acrylate, butyl acrylate, isobutyl acrylate, 2-ethylhexyl acrylate, and 3-methoxy butyl acrylate.

The monoethylenically unsaturated carboxylic acid of the copolymer is preferably one containing no more than 6 open chain carbon atoms and having its ethylenic bond on an alpha carbon atom relative to a carboxyl group. The acid may be, for example, itaconic acid, acrylic acid, methacrylic acid, crotonic acid, cinnamic acid, atropic acid, maleic acid and fumaric acid. The preferred acid is itaconic acid.

The monoethylenically unsaturated compound having an oxirane ring preferably contains a glycidyl group (2,3-epoxypropyl) and may be, for example, a glycidyl ester of an unsaturated carboxylic acid such as acrylic acid, or methacrylic acid or a glycidyl ether, e.g., an alkenyl glycidyl ether wherein the alkenyl group contains up to 3 carbon atoms. Some contemplated compounds are for example glycidyl methacrylate, glycidyl acrylate, allyl glycidyl ether and methallyl glycidyl ether. The preferred compound is glycidyl methacrylate.

The percentage of polymer in the latex after polymerization in many cases is fairly high, e.g., 30 to 55%, preferably 40 to 50% by weight of the latex.

In preparing the latex, the monomeric material and a free radical yielding catalyst are added to the prepolymerization mixture containing the surface active agent at a suitable polymerization temperature, e.g., 15° to 80° C., preferably 55° to 65° C. Some suitable catalysts are peroxide compounds such as hydrogen peroxide, either alone or in combination with other agents such as an iron salt, zinc formaldehyde sulfoxylate or a titanous salt, alkali metal persulfates such as potassium persulfate, and redox systems such as potassium persulfate and sodium bisulfite, ammonium persulfate and sodium metabisulfite, a bromate mixed with a bisulfite etc. The proportion of catalyst may be varied widely, one suitable range being 0.01% to 1.0%, preferably 0.10% to 0.3% by weight of the composition.

The polymer particles in the latices of this invention are generally of fairly small size. Most of the particles are in the range of 0.1 to 2.0 microns, often in the range of 0.2 to 0.5 micron.

The latices of this invention may be blended with various solid materials, e.g., pigments, fillers and extenders in the formulation of coating compositions. Some of the materials which may be added are titanium dioxide, such as "Titanox RA-50," lithopones such as "Albalith 14," antimony oxides, barytes, diatomaceous earth, e.g., "Celite 281," talc such as "Nytal 300," clay such as "ASP 400," mica, for example 325 mesh waterground mica, red, yellow, black and brown iron oxides, e.g., "Irox Red 1380," and "Mapico Brown," maroon oxides, metallic browns, cadmium red, toluidine red, para red, lithol toner, cadmium yellow, hansa yellow, benzidine yellow, dinitraniline orange, chrominum oxide green, phthalocyanine green, phthalocyanine blue, lampblack, carbon black, mineral black, metallic flakes and powders such as those of aluminum and copper and luminous pigments. Mixtures of more than one of these materials may, of course, also be used.

After applying the latex of this invention to a fabric, the fabric may be dried and the deposited coating cured by heating the fabric to an elevated temperature, e.g., 300 to 325° F. for a period of, for example, 5 to 10 minutes.

As an aid to curing, a curing catalyst may be added to the latex. The curing catalyst may be, for example, a conventionally acidic compound, i.e., a compound which may be dissolved in water to yield a pH of less than 7, e.g. an acid salt such as ammonium chloride or, more broadly, any Lewis acid such as boron trifluoride. The curing catalyst may be used, for example, in an amount of about 1 to 10 wt. % based on the weight of the copolymer in the latex and is effective in lowering the minimum necessary temperature and time of curing, e.g., to 275° F. and 2 minutes.

The following examples further illustrate the invention. All parts and proportions are by weight.

*Example I*

A solution of 25 parts of "Igepal–CO–970" non-ionic surface-active agent (a condensation product of nonyl phenol and ethylene oxide containing about 97% by weight of oxyethylene units based on the weight of the nonyl phenol) dissolved in 100 parts of water together with 425 parts of water were charged to a reaction vessel. Oxygen was excluded from the vessel by flushing with nitrogen. To the vessel were added 1 part of sodium metabisulfite dissolved in 15 parts of water and 0.5 part of ammonium persulfate dissolved in 10 parts of water, and 105 parts of vinyl acetate, 375 parts of ethyl acrylate, 10 parts of glycidyl methacrylate and 10 parts of itaconic acid were copolymerized over a 3½ hour period. The reaction was allowed to proceed on its own exotherm for about ¼ hour. The mass was then heated to and maintained at a temperature of about 60–65° C. by means of a hot water bath over a period of about 2½ hours and heated to and maintained at a temperature of about 80° C. over a period of about ¾ hour. The mass was then cooled to 25° C.

A stable dispersion was obtained containing about 45–46% solids.

*Example II*

The procedure of Example I was repeated except that the monomers consisted of 160 parts of vinyl acetate, 320 parts of n-propyl acrylate, 10 parts of glycidyl methacrylate and 10 parts of itaconic acid.

*Example III*

The procedure of Example I was repeated except that the monomers consisted of 225 parts of vinyl acetate, 257.7 parts of n-butyl acrylate, 2 parts of glycidyl methacrylate and 1.5 parts of itaconic acid.

*Example IV*

The procedure of Example I was repeated except that the monomers consisted of 282.5 parts of vinyl acetate, 205 parts of 2-ethylhexyl acrylate, 2 parts of glycidyl methacrylate and 1.5 parts of itaconic acid.

In Examples II to IV, stable dispersions containing about 45–46% solids were obtained.

*Examples V to VIII*

The procedure of each of Examples I to IV was used respectively except that acrylic acid was substituted for itaconic acid in each case and in the same amount by weight. In each of these examples, a stable dispersion containing about 45–46% was obtained.

An ammonium chloride curing catalyst in an amount of 5% based on the weight of the polymer was added to each of the latices in the above examples and each composition was used to wet roll coat an automabile upholstery fabric made of rayon. The coated fabrics which contained 10 to 15% of polymer based on the weight of the fabric had improved weight and body while maintaining satisfactory hand. Moreover coatings deposited from the latices of this invention after curing in air at 300° F. for 10 minutes were flexible, tough, abrasion resistant, heat resistant and resistant to dry cleaning solvents such as perchloroethylene and Stoddard solvent in addition to having good washfastness, and resistance to discoloration.

It is to be understood that the foregoing detailed description is given merely by way of illustration and that many variations may be made therein without departing from the spirit of our invention.

Having described our invention what we desire to secure by Letters Patent is:

1. A latex comprising an aqueous dispersion of a copolymer of 20 to 60 parts by weight of vinyl acetate, 1 to 3 parts by weight of monoethylenically unsaturated carboxylic acid selected from the group consisting of itaconic acid and acrylic acid, 40 to 80 parts by weight of an alkyl acrylate selected from the group consisting of ethyl acrylate, n-propyl acrylate, n-butyl acrylate and 2-ethyl hexyl acrylate, and 2 to 5 parts by weight of glycidyl methacrylate.

2. A latex comprising an aqueous dispersion of a copolymer of 20 to 60 parts by weight of vinyl acetate, 1 to 3 parts by weight of itaconic acid, 40 to 80 parts by weight of ethyl acrylate and 2 to 5 parts by weight of glycidyl methacrylate.

3. The latex of claim 2 containing as a non-ionic surface active agent a polyoxyethylated alkyl phenol in which the alkyl groups contain 8 to 9 carbon atoms and in which there are 20 to 100 oxyethylene units per phenolic unit.

4. A process comprising dispersing in water 20 to 60 parts by weight of vinyl acetate, 1 to 3 parts by weight of a monoethylenically unsaturated carboxylic acid selected from the group consisting of itaconic acid and acrylic acid, 40 to 80 parts by weight of an alkyl acrylate selected from the group consisting of ethyl acrylate, n-propyl acrylate, n-butyl acrylate and 2-ethyl hexyl acrylate, and 2 to 5 parts by weight of glycidyl methacrylate, and polymerizing said compounds with the aid of a free radical yielding polymerization catalyst.

5. A process comprising dispersing in water 20 to 60 parts by weight of vinyl acetate, 1 to 3 parts by weight of itaconic acid, 40 to 80 parts by weight of ethyl acrylate and 2 to 5 parts by weight of glycidyl methacrylate, and polymerizing said compounds with the aid of a free radical-yielding polymerization catalyst.

6. The process of claim 5 wherein said water contains dissolved therein as a non-ionic surface active agent a polyoxyethylated alkyl phenol in which the alkyl groups contain 8 to 9 carbon atoms and in which there are 20 to 100 oxyethylene units per phenolic unit.

7. A process comprising coating a fabric with the latex of claim 2 and heating the fabric to an elevated temperature to effect curing of said copolymer.

8. A copolymer of 20 to 60 parts by weight of vinyl acetate, 1 to 3 parts by weight of a monoethylenically unsaturated carboxylic acid selected from the group consisting of itaconic acid and acrylic acid, 40 to 80 parts by weight of an alkyl acrylate selected from the group consisting of ethyl acrylate, n-propyl acrylate, n-butyl acrylate and 2-ethyl hexyl acrylate, and 2 to 5 parts by weight of glycidyl methacrylate.

9. A copolymer of 20 to 60 parts by weight of vinyl acetate, 1 to 3 parts by weight of itaconic acid, 40 to 80 parts by weight of ethyl acrylate and 2 to 5 parts by weight of glycidyl methacrylate.

10. A heat cured copolymer of 20 to 60 parts by weight of vinyl acetate, 1 to 3 parts by weight of itaconic acid, 40 to 80 parts by weight of ethyl acrylate and 2 to 5 parts by weight of glycidyl methacrylate.

References Cited by the Examiner

UNITED STATES PATENTS

| | | | |
|---|---|---|---|
| 2,580,901 | 1/1952 | Erickson et al. | 260—80.5 |
| 2,753,318 | 7/1956 | Maeder | 260—29.6 |
| 2,839,514 | 6/1958 | Shokal et al. | 260—834 |
| 3,025,181 | 3/1962 | Nuessle et al. | 260—80.5 |
| 3,037,881 | 6/1962 | McDowell | 260—29.6 |
| 3,052,659 | 9/1962 | Woodruff | 260—80.5 |
| 3,090,704 | 5/1963 | Collins et al. | 260—80.5 |

MURRAY TILLMAN, *Primary Examiner.*

LEON J. BERCOVITZ, *Examiner.*

EUGENE B. WOODRUFF, WILBERT J. BRIGGS, SR.,
*Assistant Examiners.*